A. L. STARKEY.
CHURN.

No. 177,765. Patented May 23, 1876.

WITNESSES:
G. Neveux
John Goethals

INVENTOR:
A. L. Starkey
BY
ATTORNEYS.

UNITED STATES PATENT OFFICE.

ALONZO L. STARKEY, OF ELWOOD, INDIANA, ASSIGNOR TO HIMSELF AND GEORGE M. OVERSHEIMER, OF SAME PLACE.

IMPROVEMENT IN CHURNS.

Specification forming part of Letters Patent No. 177,765, dated May 23, 1876; application filed February 21, 1876.

*To all whom it may concern:*

Figure 1:
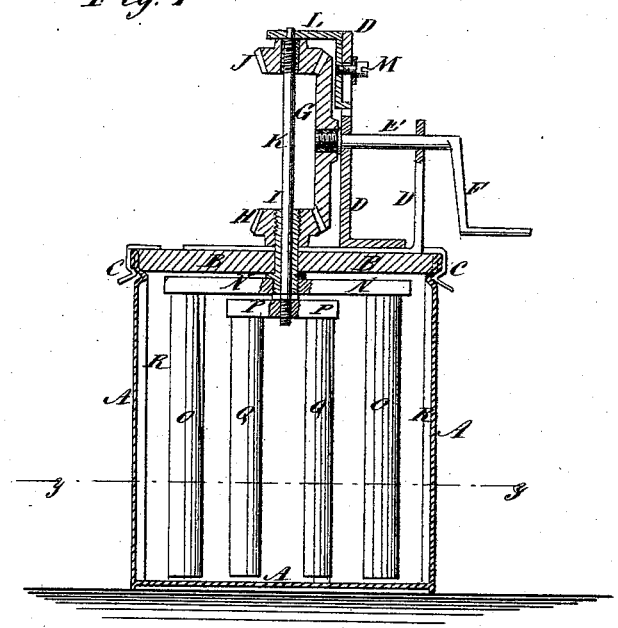
Figure 2:
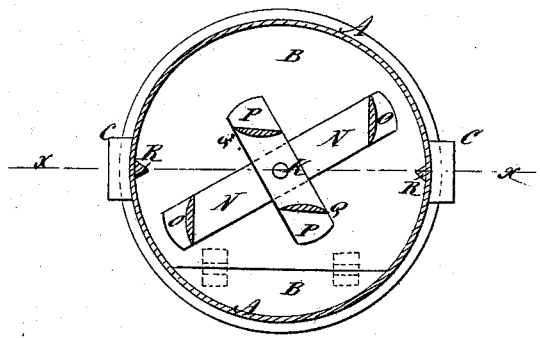

Be it known that I, ALONZO L. STARKEY, of Elwood, in the county of Madison and State of Indiana, have invented a new and useful Improvement in Churning Apparatus, of which the following is a specification:

Figure 1 is a vertical section of my improved churning apparatus, taken through the line *x x*, Fig. 2. Fig. 2 is a horizontal section of the same, taken through the line *y y*, Fig. 1, looking upward.

Similar letters of reference indicate corresponding parts.

The object of this invention is to furnish an improved churning apparatus, simple in construction, easily cleaned and operated, and effective in operation, keeping the milk in violent agitation, and bringing the butter very quickly.

The invention will first be described in connection with drawing, and then pointed out in the claim.

A represents the churn-body, which is cylindrical in form, and may be made of wood, earthenware, or metal, as may be desired. B is the lid or cover, which may be made in two unequal parts hinged to each other, and which is secured to the body A by spring-catches C. To the lid B is attached a frame or bracket, D, in which revolves a horizontal shaft, E, to the outer end of which is attached a crank, F, and upon its inner end is screwed a large bevel-gear wheel, G. The teeth of the gear-wheel G, upon its lower side, mesh into the teeth of a small bevel-gear wheel, H, attached to the upper end of a short hollow shaft, I, which revolves in a hole in the center of the lid B. The teeth of the gear-wheel G upon its upper side mesh into the small bevel-gear wheel J, screwed upon the upper part of the shaft K, the upper end of which revolves in the upper arm of an angle-bar, L, the lower arm of which is secured to the frame or bracket D by a set-screw M, which passes through a slot in said frame or bracket D, so that it may be conveniently raised, when desired, to detach the shaft K. To the lower end of the hollow shaft I is attached one or more cross-bars, N, of a length a little less than the diameter of the churn-body A, and to its ends are attached the upper ends of the vertical blades or paddles O, which are rounded upon their outer sides and are flat upon their inner side, and are set at an inclination so as to tend to throw the milk from the outer part toward the center of the churn-body. To the lower end of the shaft K, just below the cross-bar N, is attached a cross-bar, P, having blades or paddles Q, similar to the blades or paddles O attached to the cross bar N. The blades or paddles Q are inclined in the opposite direction from the paddles O, so as to throw the milk from the center toward the sides of the churn-body A.

By this construction, as the crank F is turned the two sets of paddles O Q will be turned in opposite directions, the one set of paddles throwing the milk outward and the other throwing it inward, each set meeting and breaking up the currents started by the other set, so as to keep the milk in violent agitation. The currents of milk are further broken up by vertical ribs R attached to the sides of the churn-body A, so as to increase the agitation of the milk.

I am aware that rotary paddles have been employed; but it will be observed that I make blades so that the flat sides strike the cream obliquely, so as to gather it in toward the center. By this construction the sharp edge enters the cream with little friction, and allows the churn to be worked easily, even by a child, while, by using no holes and throwing the cream continually toward the center, the churn is more easily cleaned, the liquid is not splashed out, and a less tight cover is required.

I am aware that it is not new to cause the paddles of a churn to revolve in opposite directions, but they are made to strike the cream with the vertex of the angle, thus throwing it on each side thereof, like a boat moving through the water.

What I claim is—

The combination, in a churn, of two sets of paddles revolving in opposite directions, the faces of one set being inclined so as to gather the liquid toward the center, and those of the other set to throw it back, thus producing conflicting currents, as above described.

ALONZO L. STARKEY.

Witnesses:
GEORGE W. KELLEY,
CHARLES NATION.